United States Patent
Reid et al.

(10) Patent No.: US 6,298,308 B1
(45) Date of Patent: Oct. 2, 2001

(54) DIAGNOSTIC NETWORK WITH AUTOMATED PROACTIVE LOCAL EXPERTS

(75) Inventors: Alan J. Reid, Gates Mills, OH (US); Dean A. Lofall, Poulsbo, WA (US)

(73) Assignee: Reid Asset Management Company, Wiloughby Hills, OH (US)

(*) Notice: Subject to any disclaimer, the term of this patent is extended or adjusted under 35 U.S.C. 154(b) by 0 days.

(21) Appl. No.: 09/477,959

(22) Filed: Jan. 5, 2000

Related U.S. Application Data
(60) Provisional application No. 60/134,982, filed on May 20, 1999.

(51) Int. Cl.[7] ................................................ G06F 17/30
(52) U.S. Cl. ..................................... 702/56; 702/188
(58) Field of Search .............................. 702/33, 34, 35, 702/108, 113, 182–185, 188, 56; 706/14, 45–48

(56) References Cited

U.S. PATENT DOCUMENTS

| | | | |
|---|---|---|---|
| 4,408,285 | 10/1983 | Sisson et al. ........................ | 364/508 |
| 4,517,468 | * 5/1985 | Kemper et al. ....................... | 290/52 |
| 5,109,700 | 5/1992 | Hicho ................................... | 73/660 |
| 5,414,494 | 5/1995 | Aikens et al. ....................... | 355/202 |
| 5,435,168 | 7/1995 | Granere ............................... | 73/1 DV |
| 5,481,481 | * 1/1996 | Frey et al. .......................... | 174/135 |
| 5,610,339 | * 3/1997 | Haseley et al. ...................... | 73/660 |
| 5,633,811 | 5/1997 | Canada et al. ....................... | 364/576 |
| 5,710,723 | 1/1998 | Hoth et al. ....................... | 364/551.01 |
| 5,736,970 | 4/1998 | Bozeman, Jr. ....................... | 345/35 |
| 5,808,903 | 9/1998 | Schiltz et al. ........................ | 364/508 |
| 5,814,733 | 9/1998 | Khoury et al. ........................ | 73/658 |
| 5,917,428 | * 6/1999 | Discenzo et al. ............... | 340/870.01 |
| 5,943,634 | 8/1999 | Piety et al. .............................. | 702/56 |
| 5,963,884 | 10/1999 | Billington et al. ..................... | 702/56 |
| 5,992,237 | 11/1999 | McCarty et al. ....................... | 73/659 |
| 5,995,910 | * 11/1999 | Discenzo ............................... | 702/56 |
| 6,041,287 | * 3/2000 | Dister et al. ........................ | 702/182 |

FOREIGN PATENT DOCUMENTS

| | | |
|---|---|---|
| 0814590 | 6/1997 | (EP) . |
| 09508809 | 4/1995 | (WO) . |
| 09743729 | 11/1997 | (WO) . |
| 9839718 | 9/1998 | (WO) . |
| 9960351 | 11/1999 | (WO) . |

\* cited by examiner

*Primary Examiner*—Marc S. Hoff
*Assistant Examiner*—Craig Steven Miller
(74) *Attorney, Agent, or Firm*—Renner, Otto, Boisselle & Sklar, LLP (57) ABSTRACT

A method is provided for invoking condition monitoring among a plurality of machines, comprising establishing a network of automated local experts at generally fixed locations and interconnected by at least one network connection, configuring each of the local experts to receive vibration data from at least one of the plurality of machines which is located in relative physical proximity thereto and configuring each of the local experts to analyze the received vibration data and to diagnose a condition of the machine providing the received vibration data based on the received vibration, and configuring each of the local experts to transmit diagnostic information relating to the condition of the respective machines via the at least one network connection.

66 Claims, 5 Drawing Sheets

DIAGNOSTIC NETWORK WITH AUTOMATED PROACTIVE LOCAL EXPERTS

CROSS-REFERENCE TO RELATED APPLICATION

This application claims priority back to Provisional Application Ser. No. 60/134,982, filed May 20, 1999 now expired, the entire disclosure of which is incorporated herein by reference.

TECHNICAL FIELD

The present invention relates generally to predictive maintenance, and more particularly to a diagnostic network and method which employs local experts to automatically monitor, diagnose and take action in connection with different machines included within a system.

BACKGROUND OF THE INVENTION

Vibration is produced by moving parts of machinery due to causes like unbalance, misalignment of shafts and worn out bearings. Every machine has reasonable levels of vibration that are characteristic of its operation. Excessive levels of vibration indicate machine problems which may lead to unsatisfactory operation and eventual breakdown.

Machine malfunction can sometimes be detected by a change in the vibration pattern of that machine. In today's plants where machines are complex and/or large in number, engineers rely on more advanced methods of identifying abnormal levels and patterns of vibration in order to determine the condition of a machine. It is now common to measure the level and rate of the vibrations of machines and use this data to determine which machines require servicing. This monitoring technique is called predictive maintenance.

To properly employ predictive maintenance, vibration data is typically taken and recorded on a scheduled basis during normal use of the machinery. There are a number of systems available for this purpose. Many of such systems are designed around a pool of portable data collectors. Each individual data collector is designed to be transported to a machine to be tested. Vibration data from the machine is collected, and the vibration data is subsequently uploaded to a host computer. The host computer analyzes the vibration data in order to provide a system operator with complex diagnoses. See, for example, U.S. Pat. Nos. 4,885,707 and 4,612,620.

Although such conventional systems have been useful in the past, there have been a number of drawbacks associated with such systems. For example, the portable data collectors have been limited in their ability to analyze the vibration data locally. The system host computer was required to carry out complex analysis of the data subsequent to receiving the data from the data collector. This could result in analysis delays, and could further result in missed opportunities for avoiding impending machine failure.

Furthermore, such conventional systems have tended to rely heavily on the host/client relationship between the host computer and the individual data collectors. In addition to performing the complex data analysis, the system host computer was required to provide schedule information and/or lists of machines which require predictive maintenance to the individual data collectors. If the system host computer were to fail for any reason, the predictive maintenance system as a whole could be effectively shut down. In addition, there may be instances where a communication link between the host computer and one or more of the data collectors cannot be established (e.g., due to limited accessibility to telephone lines, failed communications equipment, etc.). The dependency on a system host computer thus becomes an impediment to a smoothly functioning system.

Portable data collectors also have required considerable labor costs in the past. Several man hours are spent visiting different sites and collecting vibration data from the machines at each site. When problems are detected, oftentimes service personnel and/or more experienced data collector operators must be dispatched to the particular site to determine if in fact there are problems. Again, several more man hours can be lost which may otherwise be attributable to operator error in the original collection of data.

Some "on-line" systems have been developed recently which allow for data to be collected from machines via permanent wiring. Such systems at least partially eliminate the need for portable data collectors. Nevertheless, the systems provide little more than on-line data collection and in some instances, failure probabilities. Analyses of the data and/or advanced diagnoses based on the data are reserved typically to some central location such as the system host.

In view of the aforementioned shortcomings associated with conventional data collectors and systems, there is a strong need in the art for a data collector and system which is no longer dependent on a system host computer or portable data collectors. There is a strong need for a system which is capable of performing its own complex analyses of vibration data. Moreover, there is a strong need for a system which can operate without a system host.

SUMMARY OF THE INVENTION

The present invention provides an entirely new approach to conducting predictive maintenance. The present invention provides a system in which localized experts are provided at various machine sites. The localized experts are automated data collector/analyzers which are configured to acquire and analyze vibration data substantially continuously from one or more machines located at the site. The vibration data is analyzed in real-time and the condition of the machines may be ascertained without reliance on portable data collectors and/or analysis by a system host computer.

In a preferred embodiment, one or more local experts are provided at a given site (e.g., building, ship, boiler room, power station, etc.). Each local expert is computer-driven and is configured to receive vibration data from up to thirty-two different machines located at the site. The local expert includes an expert system and database which allows the local expert to analyze the vibration data locally for each particular machine to detect incipient failure, diagnose wear, etc.

Each local expert includes an interface which is linked to a system network such as a local-area-network (LAN) or wide-area-network (WAN). Furthermore, each local expert may communicate with a remote location via a dial-up network, the Internet, etc. The diagnoses performed by each local expert can be used to alert appropriate personnel of impending failure, wear (such as bearing wear), necessary maintenance, etc. The system enables a local expert to initiate electronic mail (email) messages and/or electronic pages to appropriate personnel indicating a machine failure or impending failure, a need for maintenance, etc.

One or more local experts typically will be sufficient to perform predictive maintenance for an entire site (e.g., an entire building) having several different machines. The database within each local expert contains information specific to the machines connected thereto, as well as information relating to machines of the same type. An expert system within each local expert draws on such information as part of a rules database and/or knowledge database also included therein. Based on such information, the local expert ascertains which machines are operating normally, or are experiencing minor, moderate or severe problems. Depending on the severity of any problems identified by the local expert as well as other possible factors, the local experts are configured to contact the appropriate personnel by email, pages, causing a network event (e.g., setting a flag), etc.

In this manner, the local experts in the present invention not only collect vibration data, but also analyze the data in order to ascertain the condition of the machine and diagnose specific problems such as thrust bearing wear, coupling misalignment, gear problems, etc. The local experts can therefore not only alert the appropriate personnel of a problem, but also can inform the personnel of the particular cause of the problem. In addition, the local experts can recommend action needed to be taken. For example, the local experts may identify which bearings need to be replaced on a machine, the specific part numbers of the bearings, and may provide instructions for enabling a maintenance engineer to make any necessary repairs.

Thus, at the same time a person is notified that there is a problem with a particular machine, that person is also notified in many instances of the particular cause of the problem and the maintenance needed to be performed. No longer does a predictive maintenance system require the sizable delays associated with data being collected by portable data collectors and/or waiting for the collected data to be analyzed. Moreover, considerable cost savings are presented as data is collected and analyzed automatically. Oftentimes the solution to a problem can be provided at the same time as a notice of the problem, thus reducing the amount of time spent analyzing and/or processing the vibration data in order to ascertain the problem using a system host computer.

Vibration data from a machine is collected and analyzed by a local expert substantially continuously. There are no voids in monitoring which are frequently found in systems requiring personnel to collect data periodically during scheduled rounds using portable data collectors.

Another feature of each local expert in accordance with the present invention is an optional connection to a central monitoring location via the dial-up network or Internet, for example. The central monitoring location may be equipped to do special analysis and/or offer user support. Each local expert is designed to be able to replicate its data within its database into a central monitoring location database. Such replication preferably is carried out automatically by the local expert such that the data is available for review at the central monitoring location substantially as soon as a problem is detected.

In addition, the local expert is configured to permit the central monitoring location or another location on a local or remote network to control the local expert via the dial-up network or Internet connection. Consequently, the central monitoring location or other location can control the local expert from a remote location to perform special testing and analysis in real time. This enables someone at the central monitoring location or elsewhere to look effectively "under the hood" of the particular machines within the network without necessitating sending personnel directly to the site.

According to one particular aspect of the invention, a method is provided for invoking condition monitoring among a plurality of machines, comprising establishing a network of automated local experts at generally fixed locations and interconnected by at least one network connection, configuring each of the local experts to receive vibration data from at least one of the plurality of machines which is located in relative physical proximity thereto and configuring each of the local experts to analyze the received vibration data and to diagnose a condition of the machine providing the received vibration data based on the received vibration, and configuring each of the local experts to transmit diagnostic information relating to the condition of the respective machines via the at least one network connection.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

The present invention will now be described with reference to the drawings, wherein like reference numerals are used to refer to like elements throughout.

Figure 1:
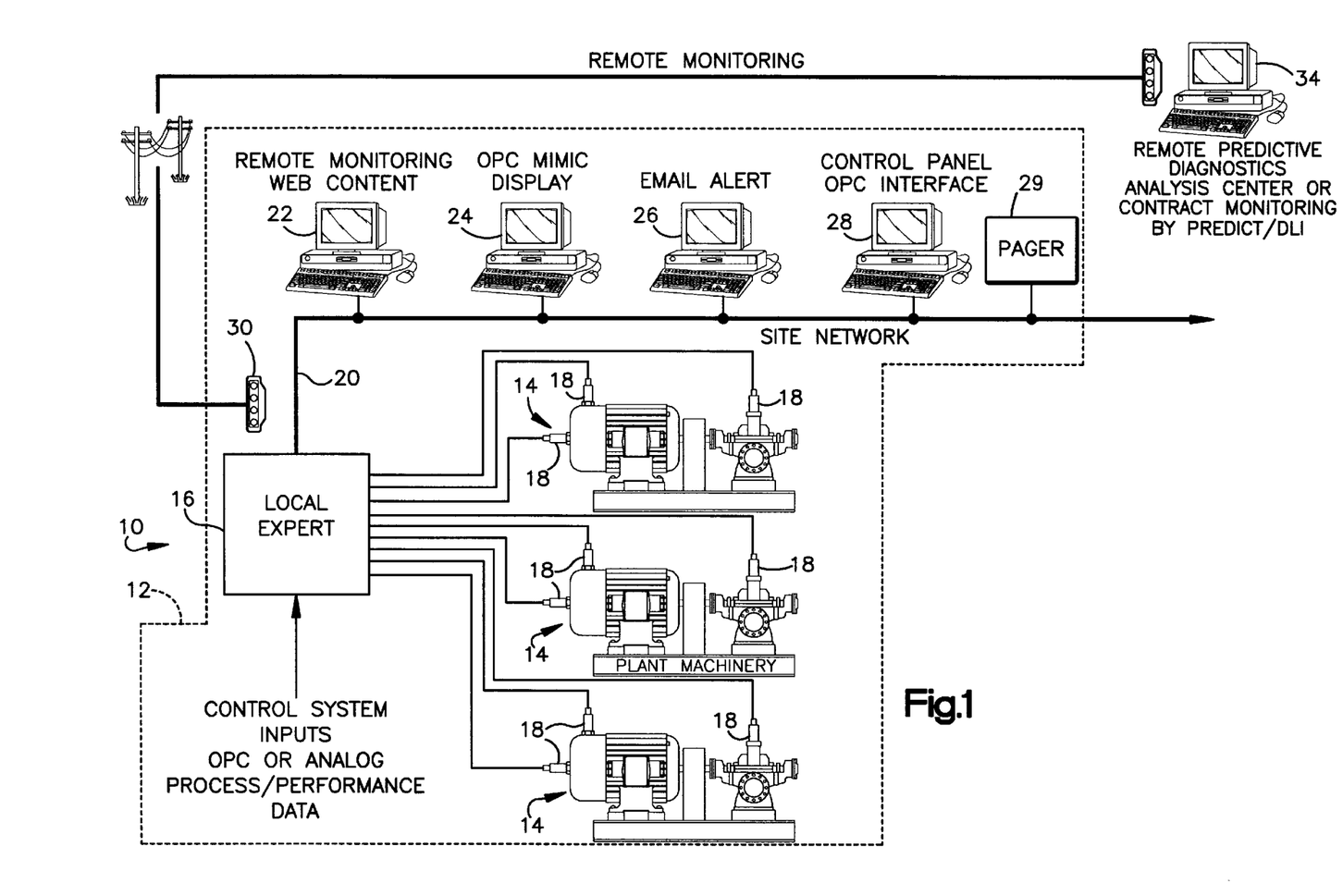
FIG. 1 is a system view illustrating a diagnostic network with an automated local expert in accordance with the present invention.

Referring initially to FIG. 1, a diagnostic network in accordance with the present invention is generally designated 10. In the exemplary embodiment of FIG. 1, the network 10 is focused around a particular site or sites (represented by phantom line 12). The site 12 may be an office building, manufacturing facility, power plant, etc., or basically any location(s) having one or more machines which are to be monitored for predictive maintenance. Such machines may be engines, turbines, compressors, generators, motors, or any other type of machine for which predictive maintenance is useful. The site 12, as exemplified in FIG. 1, includes a plurality of machines 14. The machines 14 may each be the same kind of machine or different machines as will be appreciated.

The network 10 further includes at least one local expert 16 coupled to the machines 14 for receiving predictive maintenance information such as vibration data. As will be discussed in more detail below in relation to FIGS. 3–5, each local expert 16 in the exemplary embodiment is a computer-driven data collector and analyzer. The local expert 16 receives vibration data from each of the machines 14 or a subset thereof. The local expert 16 includes an expert system for analyzing the vibration data in relation to a rules database and/or knowledge database in order to evaluate the condition of the respective machines 14. The local expert 16 includes a database which stores information on the particular machines 14 from which it receives vibration data as well as a library of data on machines of the same type. In addition, or in the alternative, the expert system may include a neural network, fuzzy logic, or other adaptive and/or predictive analyzers. By applying an appropriate set of rules and knowledge facts, for example, the local expert 16 analyzes the vibration data and diagnoses the condition of the machines 14. For example, the local expert 16 may diagnose particular bearing wear on a given machine 14. The network 10 can be distinguished over conventional on-line systems in that the local expert 16 is continuously able to collect vibration data as well as configured to analyze the data to provide diagnostic information and intelligently notify the appropriate personnel as is discussed more fully below.

As represented in FIG. 1, each machine 14 includes one or more sensors 18 (e.g., accelerometers) for providing a respective vibration data signal to the local expert 16. In the exemplary embodiment, each local expert 16 has a 32 channel input and is thus capable of receiving vibration data signals from up to 32 different sensors 18. Of course, each local expert 16 could be designed to have some other number of channels without departing from the scope of the invention. Each machine 14 may have one or more sensors 18 mounted thereon. The output from each sensor 18 is coupled to the local expert 16 via a hardwired cable, for example. Alternatively, the output of each sensor 18 may be transmitted to the local expert 16 via an optical cable link, or wirelessly via an infrared link, radio link, etc. In this manner, the local expert 16 may be mounted on a wall or some other location within the site 12, away from the vibration, dirt, debris, etc. which may be found near the machines 14. At the same time, a single local expert 16 can be used to monitor up to 32 different machines (or some other number).

FIG. 1 illustrates how the network 10 further includes a system backbone 20 (such as an Ethernet or Token Ring bus) to which each local expert 16 is coupled. The system backbone 20 typically will be part of a local area network (LAN) or wide area network (WAN) found at the site 12 which provides for everyday communications. Nevertheless, the system backbone 20 may be part of a dedicated network for use in accordance with the present invention.

A number of other devices can be coupled to the system backbone 20 for use in accordance with the present invention. Communications between the devices and the local expert(s) 16 may be based on serial or parallel data communication or a combination thereof, and are carried out using conventional network communication protocols such as Ethernet or Token Ring, as will be appreciated. Thus, additional details regarding the particular communication protocols are omitted herein for sake of brevity.

In the exemplary embodiment, the network 10 includes devices coupled to the system backbone 20 such as one or more web-based clients 22 for requesting information from the local experts 16 in a web-based format (e.g., html files). Such information includes information relating to the collected vibration data for a given machine 14, diagnostic information provided by the local experts 16, etc.

One or more "object linking embedding (OLE) process control" (commonly known as "OPC") clients are coupled to the backbone 20 for providing OPC control and review of the local experts 16. For example, an OPC mimic display client(s) 24 is provided on the backbone 20 and permits mimicking of the OPC control of the local expert(s) 16 anywhere within the network.

An email server 26 is also coupled to the backbone 20 and functions to control the routing of email messages provided by the local experts 16 within the network site 12 to their specified addresses within the network. One or more email clients (not shown) are coupled to the system backbone 20 (either directly or indirectly) and represents the addresses of personnel identified as being appropriate to receive emails from the local experts 16 regarding the condition of a machine 14.

One or more control panel OPC interfaces 28 are also provided on the system backbone 20 for allowing personnel located remote from the local experts 16 to control the local experts and/or other conditions involving the machines 14, as well as view data collected and/or analyzed by the local experts 16 as is discussed in more detail below.

One or more pager clients 29 also may be coupled to the system backbone 20. As discussed below, each local expert 16 has a pager server on board for generating and sending pager messages. The pager messages are used to send alerts as to machine condition as determined by the local experts 16. The pager client 29 shown in FIG. 1 may be a local pager facility for transmitting pages to the appropriate individual pagers within the site 12, or a link to a standard commercial paging facility which transmits pages over a wide region.

The local expert(s) 16 are each able to communicate with such devices coupled to the system backbone 20 by employing known network communication protocols as noted above. The backbone 20 may be a hardwired medium or wireless medium such as infrared, RF, etc., as will be appreciated. Likewise, connections with other networks or devices within the network system 10 may include hardwired links, wireless links, etc. Communications may take place via modem, radio transmission, satellite communications, etc., as will be appreciated.

As is discussed in more detail below, a local expert 16 which diagnoses a problem with one of the machines 14 it is monitoring is designed to notify the appropriate personnel via email, pager, and/or causing a network event, for example. Thus, if the local expert 16 diagnoses a problem it is configured to generate an email or page, for example, which is provided to the email server 26/pager client 29 via the backbone 20. The email server 26 in turn routes the email and/or pager message to the addressee. The content of the email is generated by the local expert 16, and includes the diagnoses ascertained by the local expert 16. For example, an email and/or pager text message indicating "Machine ID XYZ has minor/advanced/extreme bearing fault" is generated by the local expert 16 based on its analysis. The local expert 16 has an address book stored therein identifying the email/pager addresses of the appropriate personnel to be notified in the event of problems with a given machine 14. Such personnel may be operations and/or maintenance personnel for the particular type of machine involved. In this manner, the maintenance personnel are not required to periodically visit each machine 14 to evaluate its condition. Operations personnel are thereby notified as to whether machinery lineup changes, configuration changes, etc., are necessary. Thus, the operations and maintenance personnel can attend to other matters unless and until they receive an email or other notification identifying a problem with a particular machine 14.

The diagnoses performed by the local experts 16 are actual diagnoses where the local experts 16 diagnose and provide diagnostic information relating to the condition of the respective machines. Examples of such diagnoses include both the condition and level of severity. As specific examples, a local expert 16 may identify a "moderate decanter drive and looseness", "moderate decanter free end looseness", "moderate decanter drive end bearing wear", etc. Additional examples may be found in the *Expert Alert* software discussed below. Such diagnoses inform the receiver of the diagnostic information of the specific machine condition, not simply a general failure probability as in conventional systems.

In the preferred embodiment, the pager messages generated by the local experts 16 are relatively brief messages (e.g., on the other order of 100–200 characters). Such messages identify the specific machine 14 and diagnosed problem. Email messages, on the other hand, include additional information such as a summary of the data analysis which resulted in the local expert 16 diagnosing a problem with the machine 14, recommended maintenance information, etc.

Each local expert 16 may also be connected to another network outside of the local site network via a telephone line connection or the like. For example, each local expert 16 may include a modem 30 which serves to link the local expert 16 to an external network such as a Windows Dial Up Network (DUN) or Internet Virtual Private Network (VPN). In this manner, virtually all functions which could be carried out on the system backbone 20 using the local experts 16 can also be carried out from a remote location via the external network. In the exemplary embodiment, each local expert 16 is coupled via a modem 30 to a central monitoring location 34. The central monitoring location 34 includes analysis software similar to that found in each local expert 16. In addition, the central monitoring location 34 may include an even more extensive database from which its expert system may draw on.

Although not shown in FIG. 1, the central monitoring location 34 is part of an external network which is also configured to receive email and/or pager messages from the local experts in the same manner discussed above. As a result, an email message or pager message which is generated by a local expert 16 can be delivered via the modem 30 and telephone line to a remote network including the central monitoring location 34, for example.

Furthermore, the central monitoring location 34 is configured to control the local experts 16 via the DUN or VPN, for example, and is thus capable of performing real time analysis of data collected by a given local expert 16. As is discussed in more detail below, a local expert 16 can replicate the vibration data obtained from one or more of the machines 14 into the database of the central monitoring location 34. More experienced personnel at the central monitoring location 34 can then review the vibration data. Furthermore, using OPC control the central monitoring location 34 may control the operation of the local expert 16 to run custom testing. Of course, other remote interfaces different from OPC may be used without departing from the scope of the invention.

Human experts at the central monitoring location 34 can therefore view the data obtained by the local experts 16 from a particular machine, cause the local expert 16 to do additional testing, etc. These human experts can then replicate the data back to the local experts 16 and attach any comments or recommendations they have based on their analysis. The local experts 16 are configured to display such data and comments to facilitate the actions of on-site personnel.

One advantage of the present invention is that vibration data can be collected, analyzed and, in the case of a problem, people can be notified of the problem, repairs may be suggested, and the central monitoring location can be provided with relevant vibration data all in advance of human intervention. Thus, the present invention allows corrective action to begin even before a human may be aware that a given machine 14 may have a problem.

Figure 2:
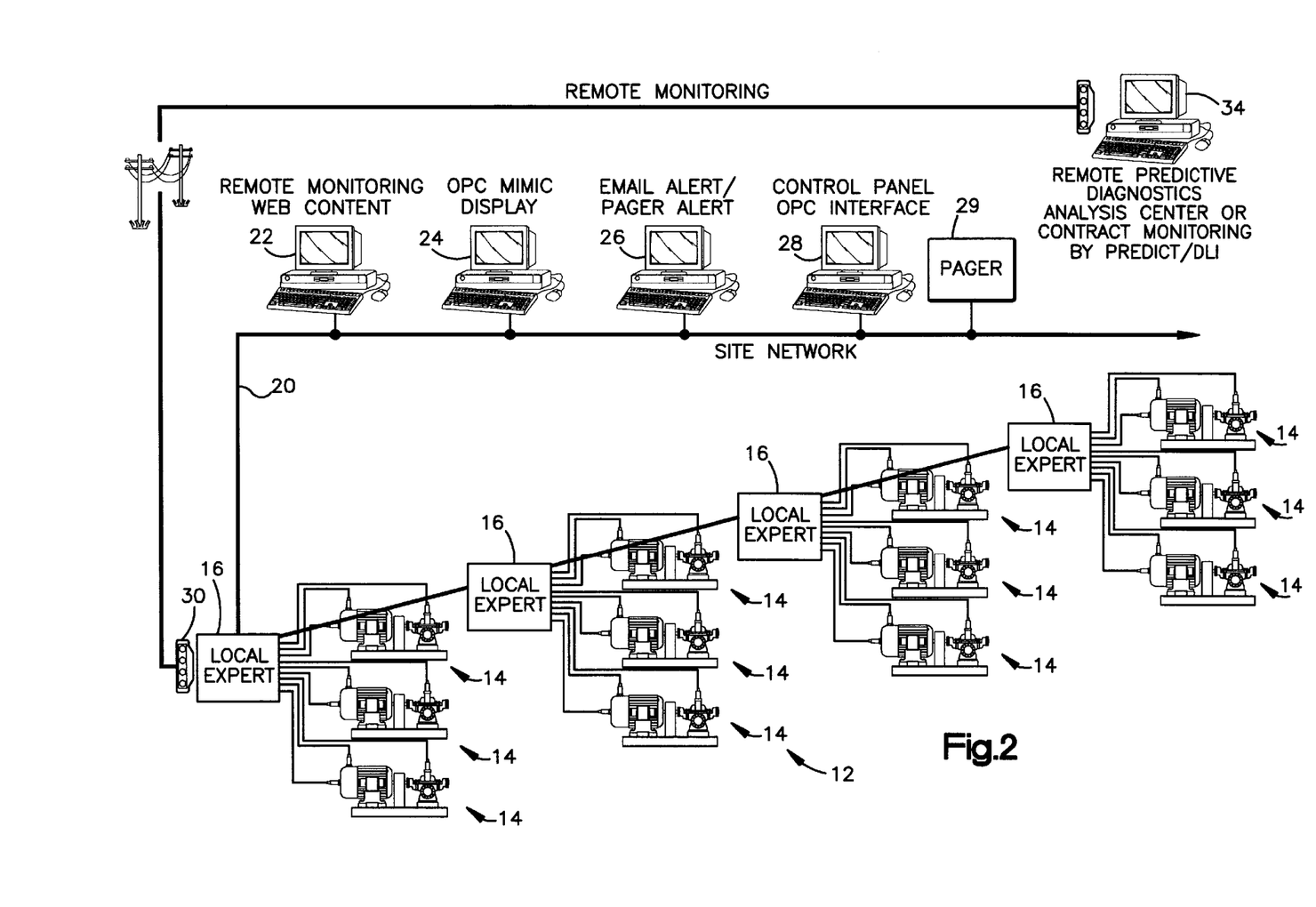
FIG. 2 is a system view illustrating a diagnostic network including a plurality of local experts in accordance with the present invention.

FIG. 2 illustrates an embodiment wherein several local experts 16 are located at the site 12. Each local expert 16 is coupled to the system backbone 20 and is configured to communicate with the respective devices 22, 24, 26, 28 and 29 in the same manner described above. In addition, each local expert 16 communicates via a modem 30 (shared or individual) to the external DUN or VPN.

Figure 3:
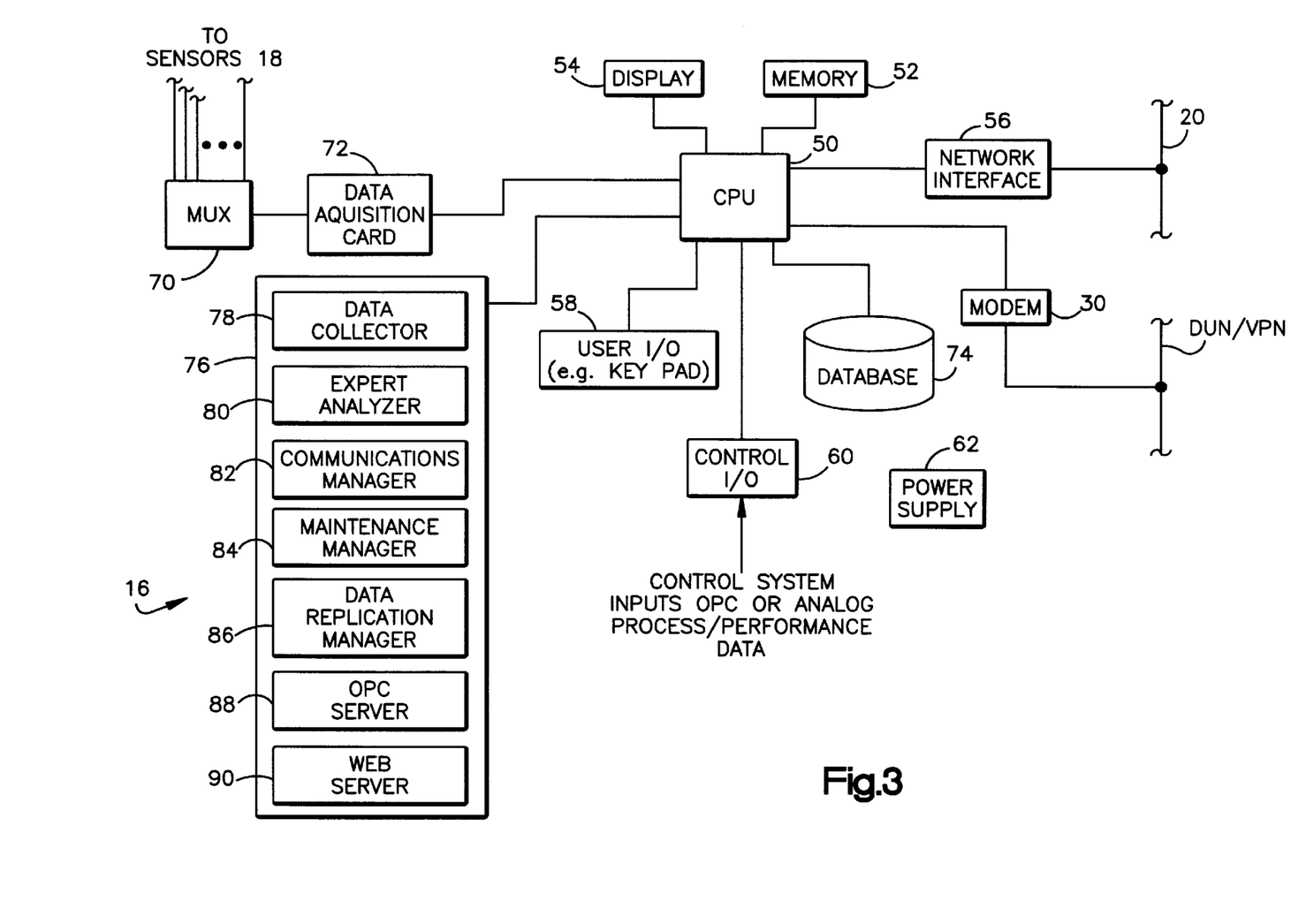
FIG. 3 is a block diagram of a local expert in accordance with the present invention.

FIG. 3 is a block diagram illustrating an exemplary embodiment of a local expert 16. The local expert 16 includes a central processing unit (CPU) 50 which is programmed to carry out the various functions described herein using conventional programming techniques. The CPU 50 may be any suitable processor such as the commercially available Intel Pentium or AMD K6 microprocessors. The local expert further includes a memory 52 comprising volatile and non-volatile memory serving as working memory as well as storing system software for causing the local expert to perform the functions described herein. Since such functions may be carried out using code written in any of a number of different programming languages using conventional techniques, details regarding the specific code have been omitted herein for sake of brevity.

A display 54 serves to display information to a user, such as providing a visual status display indicating the operation of the local expert 16. A suitable network interface 56 is included for permitting the local expert to communicate with other devices on the system backbone 20. As mentioned previously, the modem 30 is included which allows the local expert 16 to communicate with other devices on the external network (e.g., DUN or VPN). A user interface 58 such as a keypad or touch sensitive screen is optionally provided to allow a user to input information locally at the site 12. In addition, a control interface 60 is provided which allows the local expert 16 to receive control system inputs, data, etc. locally at the site 12. A power supply 62 provides suitable operating power to the local expert 16. In the case where the local expert 16 is located close to a standard wall outlet, the power supply 62 may serve to provide power based on a standard 120 volt system, for example. In the event the local expert 16 is located at a remote site 12, the power supply 62 may be designed to provide operating power based on battery power, solar power, etc.

Continuing to refer to FIG. 3, the local expert includes a multiplexer 70 which receives as an input the signals from each of the sensors 18 from the various machines 14 corresponding thereto. Under the control of the CPU 50, the multiplexer 70 determines from which machine 14 and sensor 18 vibration data is received at a given period in time. The output of the multiplexer 70 is provided to a data acquisition card 72 which conditions, filters and digitizes the data from each machine 14. The vibration data from each machine 14 is then stored in a database memory 74 included in the local expert 16. The database memory 74 is a large, non-volatile memory such as a conventional hard disk storage medium found in personal computers. In addition to storing vibration data obtained from the machines 14, the database 74 also stores information relating to other machines, trending information, a rules database and/or knowledge database, process and performance information, etc., which are used by the local expert 16 for analyzing the vibration data and making diagnoses.

More particularly, the local expert 16 includes an expert system 76 embodied in software which is stored in the memory 52 and/or the database 74. The expert system 76 includes a data collector module 78 which is designed to oversee the collection of vibration data from each of the machines 14 to which the local expert 16 is connected. The local expert 16 further includes an expert analyzer module 80 designed to analyze the vibration data collected from each of the machines 14 connected thereto in order to diagnose the condition of the machines 14. The data collector module 78 and the expert analyzer module 80 employ the same features and functions which are found in the DCX Portable Data Collector/Analyzer commercially available from Predict/DLI, Bainbridge, Wash., USA. Details regarding the expert analysis and the functions thereof can also be found in relation to the *Expert Alert* software available in the DCX Portable Data Collector/Analyzer from Predict/DLI. Consequently, further details regarding such aspects of the invention have been omitted for sake of brevity.

The expert system 76 further includes a communications manager 82 which includes tables listing the network addresses, email addresses, pager addresses, etc. of the appropriate personnel to be notified in the event of a problem with any particular machine 14. The contents of such tables are provided to the local expert 16 as part of the system initialization. The communications manager 82 also keeps track of the appropriate communications protocol to be used when communicating with the intended party. For example, the communications manager 82 keeps track of whether a message relating to the condition of a machine is to be communicated as an email, a page, standard network communication, or the like. In addition, the communications manager 82 takes care of packaging the communications from the local expert 16 into the appropriate format. The communications manager 82 embodies within itself software executed by the CPU 50 which serves as a pager server and email client as desired for carrying out the communications referred to herein.

The expert system 76 also includes a maintenance manager 84 for facilitating maintenance of a given machine 14. In the preferred embodiment, the maintenance manager 84 includes in memory details relating to the maintenance and repair of the particular machines 14 coupled to the local expert 16. Such details may be stored in the local expert 16 as part of the system initialization. For example, the maintenance manager 84 may include a list of parts which are subject to wear in connection with each machine 14. Such parts may include bearings, sleeves, rotors, etc. In the event the expert analyzer 80 detects that a part is failing (e.g., a bearing is exhibiting wear), the maintenance manager 84 can look to a look-up table in memory within the local expert 16 and identify the particular part (e.g., bearing size, part number, etc.). This information can then be transmitted by the local expert 16 to the appropriate personnel via an email, page, etc. to notify them of the need for a part to facilitate advance procurement. Furthermore, the maintenance manager 84 includes within a look-up table in memory details regarding the repair of different types of failures in the machines 14. For example, the maintenance manager 84 draws from such information and automatically provides details to a user on how to replace a bearing which is worn or has failed via the display 54. Such information may include drawings, instructions, etc. which are shown on the display 54. In addition, or in the alternative, such information is attached to an email message notifying the appropriate personnel of the problem with the machine 14.

The particular type and content of the repair information will depend, of course, on the diagnosed problem and the particular machine 14. Nevertheless, it is particularly useful for the local expert 16 to be able to provide maintenance instruction locally and throughout the network based on the diagnosed problem.

The expert system 76 also includes a data replication manager 86 used to duplicate data obtained by the local expert 16 and provide such data to another device such as the central monitoring location 34. The data replication manager 86 is designed to replicate data obtained from a machine 14 in the event a problem is diagnosed in the machine 14 by the expert analyzer 80. Upon diagnosing a problem, depending on the severity the data replication manager 86 initiates a communication link between the local expert 16 and the central monitoring location 34, for example, and the vibration data from the machine 14 is copied to the central monitoring location 34 automatically. In this manner, the replicated data will be available at the central monitoring location 34 almost as soon as a problem is detected. This saves time as someone at the central monitoring location 34 can further analyze the data without waiting for service personnel to visit the site 12 to ascertain the problem and acquire the data. Personnel at the central monitoring location 34 can be evaluating the vibration data locally even as other personnel are being notified of the problem via email, pager, etc. Since the personnel at the central monitoring location 34 will thereby have local access to the replicated data, this also avoids delays which can-arise due to slow network communications if the central monitoring location 34 were to access the database of the local expert 16 directly. Also, since the data in the local expert 16 is replicated in the central monitoring location 34, this provides a level of data redundancy which is useful particularly in the event of a data storage failure in the local expert 16, for example. An advantage of data replication as carried out between the local experts 16 and the central monitoring location 34 is that only data which has been changed since the last time replication was performed need be carried out.

The expert system 76 further includes an OPC server 88 for allowing OPC control of the local expert 16 via the central monitoring location 34 or other remote controller (e.g., OPC interface 28). OPC control allows the remote device to review data obtained by the local expert 16, as well as control the function thereof. Thus, if a problem arises where someone at the central monitoring location wishes to runs some special tests in relation to a machine 14, the local expert 16 may be controlled to perform such tests via the DUN, VPN, etc.

The local expert 16 also includes a web server 90 responsible for maintaining one or more web-based files within the local expert 16. Such files preferably are maintained with information relating to the analysis of the vibration data for the respective machines. Thus, someone out on the network (either locally or via the DUN or VPN can access the web pages from the local expert 16 and ascertain the condition of the machines 14.

Figure 4:
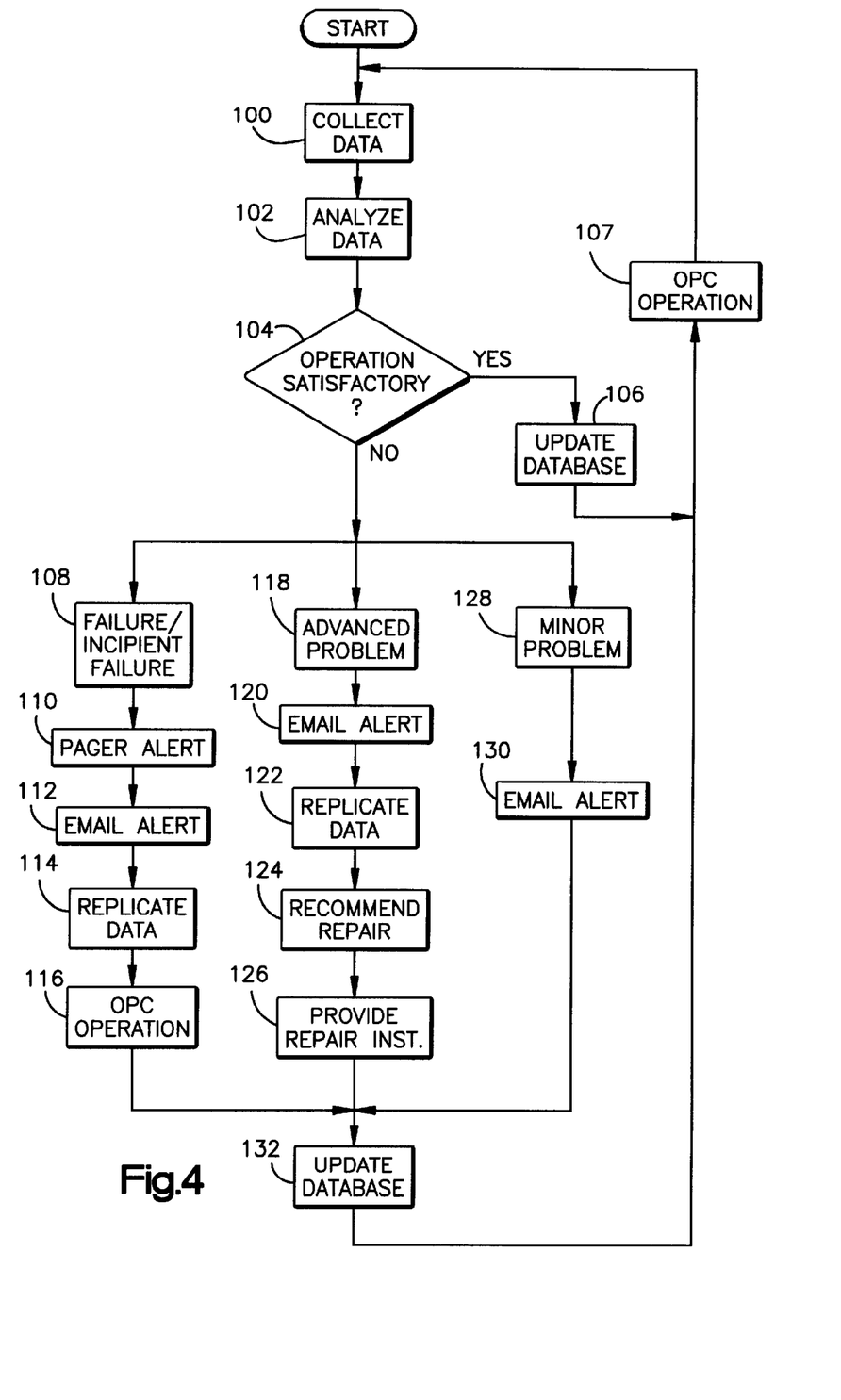
FIG. 4 is a flowchart suitable for programming the operation of the local experts in accordance with the present invention.

FIG. 4 is a flowchart illustrating the general operation of each local expert 16. In step 100, the local expert 16 collects data from a given machine 14 by virtue of the data collector module 78. Next, the local expert 16 analyzes the collected data using the expert analyzer in step 102. As previously noted, such analysis is the same as that employed in the DCX Data Collector/Analyzer with *Expert Alert* software discussed above. The analysis includes sensitivity to various operating states of the machine 14, e.g., whether under full operation, partial operation, or powered down. Based on such analysis, the condition of the respective machines 14 connected to the local expert 16 can be diagnosed. In the exemplary embodiment, any problems with the machine are predefined as being either extreme so as to indicate failure or incipient failure, advanced, or minor. Thus, in step 104 the local expert 16 determines if operation of the machine 14 from which data has been collected is satisfactory. If yes, the local expert proceeds to step 106 in which the vibration data information for the machine 14 is updated in the database 74. In step 107, OPC operation availability is represented as always available for control of the local device 16, review of the data therein, and/or control of the processes associated with the machines 14. For example, if a problem with a machine 14 is detected, OPC control can be used to power down the machine 14 or perform other process control from the remote location.

If a problem is diagnosed in steps 102 and 104, the local expert 16 proceeds based on whether the problem is predefined as extreme, moderate or minor. It will be appreciated that although the exemplary embodiment identifies three general types of problems and responses thereto, there are countless other ways in which operation can be categorized and implemented. If the diagnosed problem is considered indicative of failure or incipient failure as represented in step 108, the communications manager 82 causes a pager message(s) and email(s) to be sent out indicating the particular machine 14 and problem diagnosed by the expert analyzer 76. Such messages are sent to the appropriate personnel responsible for handling such information as represented in steps 110 and 112. Next, in step 114 the data replication manager 86 proceeds to replicate automatically the vibration data indicating the problem to the central monitoring location 34 so that such information will be readily available to those desiring to study the data in more detail. In addition, the OPC server 88 in step 116 allows for control of the local expert 16 via the DUN or VPN as desired. Further steps such as recommending maintenance via the maintenance manager 84 may also be employed.

If the problem diagnosed in steps 102 and 104 is considered advanced as represented in step 118, it may be desired that the local expert 16 forgo sending a pager message and instead simply send an email message alerting the appropriate personnel of the particular problem as represented in step 120. Thereafter, the local expert 16 proceeds to replicate the data in step 122 in the same manner described above in relation to step 114. Next, in step 124 the maintenance manager 84 generates information regarding repair of the diagnosed problem. For example, the maintenance manager 84 looks up information stored in memory in the local expert 16 relating to the failed part, etc. as diagnosed by the expert analyzer 80. Such information is then provided to the appropriate personnel via the communications manager 82. In step 126, the maintenance manager 84 looks up repair information stored in the local expert 16 and displays the information via the display 54, for example. As represented in step 107, OPC control remains available in the background.

Should the problem diagnosed in steps 102 and 104 be considered minor as represented in step 128, the communications manager 82 in step 130 may simply provide an email message to the appropriate personnel as in steps 112 and 120, for example. It will be appreciate that FIG. 4 illustrates an exemplary manner in which various types of problems can be handled by way of different notices, control, replication of data, etc. Other configurations are well within the intended scope of the present invention.

Following steps 116, 126 and 130, the local expert 16 proceeds to update its database 74 with the information obtained by the analysis as represented in step 132. Process then returns to step 100 where the vibration data for the other machines 14 to which the local expert 16 is connected is collected.

Figure 5:
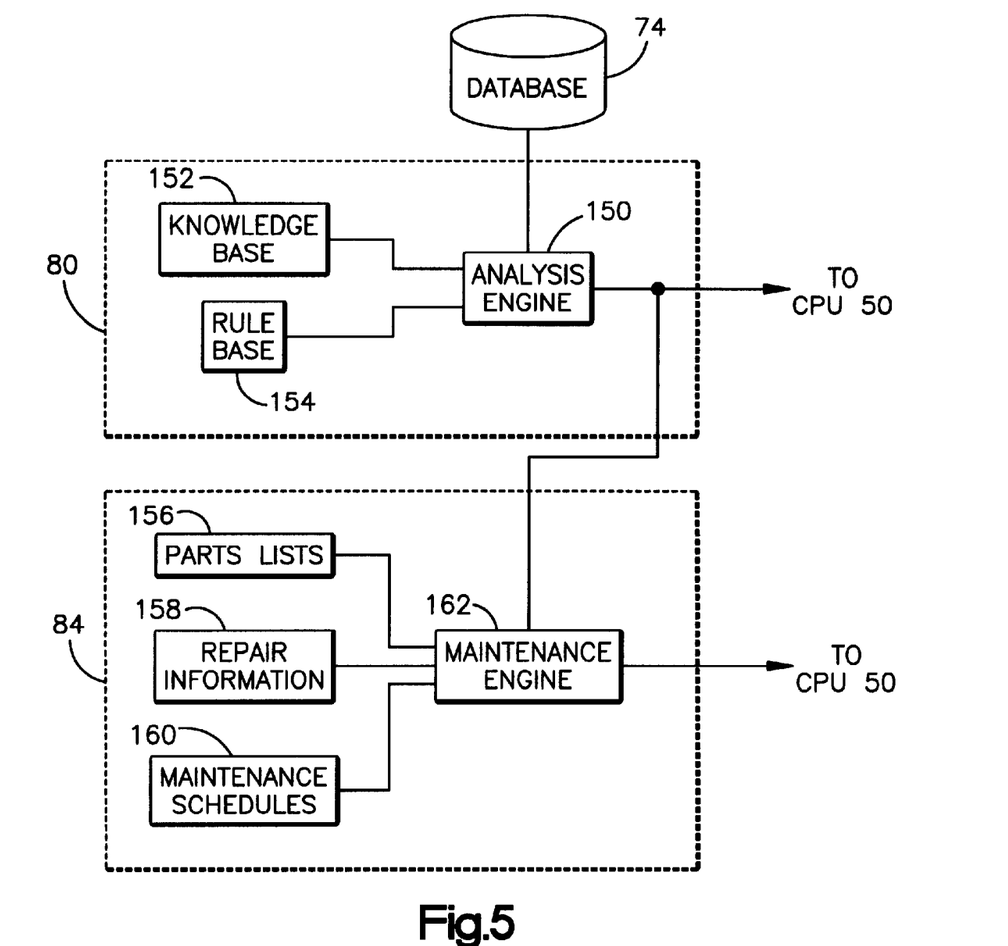
FIG. 5 is a block diagram illustrating in more detail the expert analyzer and maintenance manager in accordance with the present invention.

FIG. 5 illustrates in more detail the expert analyzer 80 and maintenance manager 84 of the expert system 76. The expert analyzer 80 comprises an analysis engine 150 which draws upon information contained in a knowledge database 152 and a rules database 154. The databases 152 and 154 include information specific to the particular machines 14, as well as machines which are generally the same type. In addition, or in the alternative, the expert analyzer employs a neural network or fuzzy-based system trained to diagnose machine faults based on vibration data obtained by the local expert 16. Those having ordinary skill in the art of expert systems will appreciate the manner in which the analysis engine 150 may draw from information included in the knowledge database 152 and a rules database 154 to diagnose problems in a given machine 14 based on its vibration data. Such diagnosis is then output to the CPU 50 as well as input to the maintenance manager 84. The maintenance manager 84 receives the diagnosis at looks to information included within its look up tables to provide relevant information to the appropriate personnel.

In the exemplary embodiment, the maintenance manager 84 includes a parts list 156 which has stored therein the relevant parts for each machine 14 connected to the local expert 16. The maintenance manager 84 uses such information to notify personnel of the particulars involving a part which may have failed or will soon fail as determined by the expert analyzer 80. The maintenance manager 84 further includes repair information 158 which the maintenance manager relies upon for providing repair information relating to a diagnosed problem. In addition, the maintenance manager includes maintenance schedules 160 which may be used to enable the local expert 16 to automatically send out reminders via email that a particular machine 14 is in need of routine maintenance. Each of the parts lists 156, repair information 158 and maintenance schedules 160 are handled by a maintenance engine 162 for delivery to the CPU 50 as needed.

Another feature of the present invention is that each of the local experts 16 is configured to transmit periodically a status message to the central monitoring location 34 confirming that the local expert 16 is itself functioning properly. More specifically, local experts 16 are configured to run self-tests to confirm proper operation. If a local expert 16 reports a status problem or fails to report within an expected period, the central monitoring location 34 can then notify the appropriate personnel so that corrective action may be taken. Such status reports from the local experts 16 may be provided via email, for example, or other network communication. Of course, other approaches may also be used for ascertaining the operational status of the local experts 16 without departing from the scope of the invention.

Also, in the preferred embodiment the local experts 16 periodically provide machine condition reports to the central monitoring location 34 with respect to the machines 14 being monitored. Thus, even in the event no problems are diagnosed a local expert 16 periodically provides a condition and/or status report for each machine 14 being monitored to the central monitoring location 34. This allows central databases to be created, evaluated, etc. At the same time, each local expert 16 preferably periodically replicates its database to the central monitoring location 34. In this manner, less data needs to be replicated at any give time since less data will have changed and require updating since the last time replication was performed. This avoids delays due to data transfer at more critical times such as when a severe machine problem is diagnosed. The periodicity of the status reports, machine condition reports and data replication may be the same or different as desired.

Thus, it will be appreciated that the present invention provides a network system and method for conducting predictive maintenance in which localized experts are provided at various machine sites. The localized experts are automated data collector/analyzers which are configured to acquire and analyze vibration data substantially continuously from one or more machines located at the site. The vibration data is analyzed in real-time and the condition of the machines may be ascertained without the reliance on portable data collectors and/or analysis by a system host computer.

Local experts at a given site (e.g., building, ship, boiler room, power station, etc.) are computer-driven and are configured to receive vibration data from up to thirty-two different machines located at the site. The local expert includes an expert system and database which allows the local expert to analyze the vibration data locally for each particular machine to detect incipient failure, diagnose wear, etc. Each local expert includes an interface which is linked to a system network such as a local-area-network (LAN) or wide-area-network (WAN), and may communicate with a remote location via a dial-up network, the Internet, etc. The diagnoses performed by each local expert can be used to alert appropriate personnel of impending failure, wear (such as bearing wear), necessary maintenance, etc. The system enables a local expert to initiate electronic mail (email) messages and/or electronic pages to appropriate personnel of a machine failure or impending failure, a need for maintenance, etc.

In another embodiment, one or more information servers (not shown) may reside at different locations on the network 10 or elsewhere via a WAN connection. The information servers are configured to receive the diagnostic information from the local experts 16. The local experts 16 may be configured to provide the diagnostic information to the information servers automatically, or upon receiving a prompt from the information servers via the network. The information servers in turn are configured to decide if and when to send a message, dial a modem, update a remote web site, or otherwise pass the diagnostic information from the local experts 16 on to another network location.

Accordingly, the present invention is no longer dependent on a system host computer or portable data collectors. The present invention is capable of performing its own complex analyses of vibration data and can operate without a system host. The present invention eliminates the need for extensive maintenance personnel resident at each site.

Although the invention has been shown and described with respect to certain preferred embodiments, it is obvious that equivalents and modifications will occur to others skilled in the art upon the reading and understanding of the specification. For example, while the invention is described primarily in the context of a hard-wired network, it will be appreciated that the various connections between components can be carried out using wireless techniques such as optical, infrared or RF without departing from the scope of the invention. Furthermore, the local experts 16 described herein may be programmed to perform trending with respect to the collected data. Such trending can be incorporated into the expert analyzer.

In addition, predictive maintenance data other than vibration data can be utilized without departing from the scope of the invention. For example, lubricant analysis or other means for evaluating the condition of the machines can be incorporated into the local experts. Moreover, although the preferred embodiment includes the local experts mounted separate and apart from the respective machines, it will be appreciated that a local expert could be mounted to each machine. The local expert can be an aftermarket device which is mounted to the machine, or a piece of original equipment which is provided with the machine itself.

The present invention includes all such equivalents and modifications.

What we claim:

1. A method for invoking condition monitoring among a plurality of machines, comprising the steps of:

establishing a network of automated local experts at generally fixed locations and interconnected by at least one network connection;

configuring each of the local experts to receive vibration data from at least one of the plurality of machines which is located in relative physical proximity thereto;

configuring each of the local experts to analyze the received vibration data and to diagnose a condition of the machine providing the received vibration data based on the received vibration;

configuring each of the local experts to transmit diagnostic information relating to the condition of the respective machines via the at least one network connection to a client; and controlling the local experts via the client.

2. The method of claim 1, wherein the at least one network connection comprises a local area network (LAN) connection.

3. The method of claim 1, wherein the at least one network connection comprises at least one of a wide area network (WAN), dial-up network (DUN), virtual private network (VPN), Internet connection, serial connection and parallel connection.

4. The method of claim 1, wherein at least one of the local experts is configured to transmit the diagnostic information via the at least one network to the client at a predefined location.

5. The method of claim 4, wherein the predefined location is a local facility proximate the machine to which the diagnostic information pertains.

6. The method of claim 5, wherein the local facility receives diagnostic information from a plurality of the local experts.

7. The method of claim 5, wherein the predefined location is a remote facility located off-site relative to the machine to which the diagnostic information pertains.

8. The method of claim 7, wherein the remote facility receives diagnostic information from a plurality of the local experts.

9. The method of claim 1, wherein at least one of the local experts is configured to transmit the diagnostic information using at least one of an electronic mail message and a pager message.

10. The method of claim 1, wherein at least one of the local experts substantially continuously analyzes received vibration data.

11. The method of claim 1, wherein the local experts each comprise a predictive or adaptive based expert system.

12. The method of claim 11, wherein the local experts each comprise at least one of a knowledge base, a rule base, and a neural network for diagnosing a condition of a machine.

13. The method of claim 1, wherein the local experts are each configured to diagnose at least one of wear, incipient failure, and required maintenance based on the received vibration data, and to transmit diagnostic information relating to such diagnosis via the at least one network connection.

14. The method of claim 1, wherein the local experts are each configured to diagnose a cause of a problem based on the received vibration data and to transmit diagnostic information identifying the cause of the problem together with recommended action to be taken via the at least one network connection.

15. The method of claim 14, wherein the diagnostic information comprises an identity of a machine part and recommended maintenance relating to the machine part.

16. The method of claim 1, further comprising a step of configuring each of the local experts to replicate at least a portion of the received vibration data from a machine to the client at a central monitoring location automatically upon diagnosing a problem with the machine.

17. The method of claim 1, wherein methods by which the local experts transmit the diagnostic information via the at least one network connection vary as a function of a predefined level of severity of a diagnosed condition.

18. The method of claim 17, wherein the methods comprise electronic mail and paging.

19. The method of claim 18, wherein pages comprise relatively brief messages identifying a specific machine and diagnosed problem, and electronic mail messages comprise additional information.

20. The method of claim 19, wherein the additional information comprises at least one of a summary of the data analysis which resulted in the diagnosis and recommended maintenance.

21. The method of claim 1, wherein at least one of the local experts includes a modem for connecting the local expert to the at least one network connection.

22. The method of claim 1, wherein the local experts are each configured to include tables stored in memory identifying network addresses, email addresses and pager addresses of personnel to be notified in an event a problem is diagnosed with a particular machine.

23. The method of claim 1, wherein the local experts are each configured to store maintenance information in memory and to supply such information to a user in response to analyzing the received vibration data and diagnosing a condition of the machine.

24. The method of claim 1, further comprising the steps of configuring each of the local experts to carry out self-tests to confirm proper operation, and to notify the network of an operational problem via the at least one network connection in the event of a self-test failure.

25. The method of claim 1, further comprising the step of configuring each of the local experts to periodically provide machine condition reports to the client at a central location via the at least one network connection.

26. The method of claim 1, wherein each of the local experts analyzes the vibration data substantially in real time.

27. The method of claim 1, wherein the at least one network connection comprises a hard-wired network.

28. The method of claim 1, further comprising the step of configuring the local experts to receive additional data relating to a physical parameter of the machines other than vibration.

29. The method of claims 28, wherein the additional data relates to lubricant analysis.

30. The method of claim 1, wherein at least one of the local experts is associated with a particular one of the plurality of machines.

31. The method of claim 30, wherein the at least one of the local experts is physically mounted to a corresponding particular one of the plurality of machines.

32. A method for invoking condition monitoring among a plurality of machines, comprising the steps of:
   establishing a network of automated local experts at generally fixed locations and interconnected by at least one network connection;
   configuring each of the local experts to receive vibration data from at least one of the plurality of machines which is located in relative physical proximity thereto;
   configuring each of the local experts to analyze the received vibration data and to diagnose a condition of the machine providing the received vibration data based on the received vibration; and
   configuring each of the local experts to transmit diagnostic information relating to the condition of the respective machines via the at least one network connection; and
   configuring the local experts to permit control thereof from a remote location via the at least one network connection.

33. A system for invoking condition monitoring among a plurality of machines, comprising:
   a network of automated local experts at generally fixed locations and interconnected by at least one network connection;
   each of the local experts being configured to receive vibration data from at least one of the plurality of machines which is located in relative physical proximity thereto;
   each of the local experts being configured to analyze the received vibration data and to diagnose a condition of the machine providing the received vibration data based on the received vibration; and
   each of the local experts being configured to transmit diagnostic information relating to the condition of the respective machines via the at least one network connection to a client; and
   each of the local experts being controllable by the client.

34. The system of claim 33, wherein the at least one network connection comprises a local area network (LAN) connection.

35. The system of claim 33, wherein the at least one network connection comprises at least one of a wide area network (WAN), dial-up network (DUN), virtual private network (VPN), Internet connection, serial connection and parallel connection.

36. The system of claim 33, wherein at least one of the local experts is configured to transmit the diagnostic information via the at least one network to the client at a predefined location.

37. The system of claim 36, wherein the predefined location is a local facility proximate the machine to which the diagnostic information pertains.

38. The system of claim 37, wherein the local facility receives diagnostic information from a plurality of the local experts.

39. The system of claim 37, wherein the predefined location is a remote facility located off-site relative to the machine to which the diagnostic information pertains.

40. The system of claim 39, wherein the remote facility receives diagnostic information from a plurality of the local experts.

41. The system of claim 33, wherein at least one of the local experts is configured to transmit the diagnostic information using at least one of an electronic mail message and a pager message.

42. The system of claim 33, wherein at least one of the local experts substantially continuously analyzes received vibration data.

43. The system of claim 33, wherein the local experts each comprise a predictive or adaptive based expert system.

44. The system of claim 43, wherein the local experts each comprise at least one of a knowledge base, a rule base, and a neural network for diagnosing a condition of a machine.

45. The system of claim 33, wherein the local experts are each configured to diagnose at least one of wear, incipient failure, and required maintenance based on the received vibration data, and to transmit diagnostic information relating to such diagnosis via the at least one network connection.

46. The system of claim 33, wherein the local experts are each configured to diagnose a cause of a problem based on the received vibration data and to transmit diagnostic information identifying the cause of the problem together with recommended action to be taken via the at least one network connection.

47. The system of claim 46, wherein the diagnostic information comprises an identity of a machine part and recommended maintenance relating to the machine part.

48. The system of claim 33, wherein each of the local experts is configured to replicate at least a portion of the received vibration data from a machine to the client at a central monitoring location automatically upon diagnosing a problem with the machine.

49. The system of claim 33, wherein methods by which the local experts are configured to transmit the diagnostic information via the at least one network connection vary as a function of a predefined level of severity of a diagnosed condition.

50. The system of claim 49, wherein the methods comprise electronic mail and paging.

51. The system of claim 50, wherein pages comprise relatively brief messages identifying a specific machine and diagnosed problem, and electronic mail messages comprise additional information.

52. The system of claim 51, wherein the additional information comprises at least one of a summary of the data analysis which resulted in the diagnosis and recommended maintenance.

53. The system of claim 33, wherein at least one of the local experts includes a modem for connecting the local expert to the at least one network connection.

54. The system of claim 33, wherein the local experts are each configured to include tables stored in memory identifying network addresses, email addresses and pager addresses of personnel to be notified in an event a problem is diagnosed with a particular machine.

55. The system of claim 33, wherein the local experts are each configured to store maintenance information in memory and to supply such information to a user in response to analyzing the received vibration data and diagnosing a condition of the machine.

56. The system of claim 33, wherein each of the local experts is configured to carry out self-tests to confirm proper operation, and to notify the network of an operational problem via the at least one network connection in the event of a self-test failure.

57. The system of claim 33, wherein each of the local experts is configured to periodically provide machine condition reports to the client at a central location via the at least one network connection.

58. The system of claim 33, wherein each of the local experts analyzes the vibration data substantially in real time.

59. The system of claim 33, wherein the at least one network connection comprises a hard-wired network.

60. The system of claim 33, wherein the local experts are configured to receive additional data relating to a physical parameter of the machines other than vibration.

61. The system of claim 60, wherein the additional data relates to lubricant analysis.

62. The system of claim 33, wherein at least one of the local experts is associated with a particular one of the plurality of machines.

63. The system of claim 62, wherein the at least one of the local experts is physically mounted to a corresponding particular one of the plurality of machines.

64. The system of claim 33, wherein each of the local experts is configured to provide reports to notify the network of the operating status of at least one of the local expert and a machine being analyzed by the local expert.

65. The system of claim 33, wherein the at least one network connection comprises at least one of a wireless link, radio link, and satellite link.

66. A system for invoking condition monitoring among a plurality of machines, comprising:
   a network of automated local experts at generally fixed locations and interconnected by at least one network connection;
   each of the local experts being configured to receive vibration data from at least one of the plurality of machines which is located in relative physical proximity thereto;
   each of the local experts being configured to analyze the received vibration data and to diagnose a condition of the machine providing the received vibration data based on the received vibration; and
   each of the local experts being configured to transmit diagnostic information relating to the condition of the respective machines via the at least one network connection;
   wherein the local experts are configured to permit control thereof from a remote location via the at least one network connection.

* * * * *